J. URBANICK.
LAWN MOWER.
APPLICATION FILED SEPT. 8, 1905. RENEWED OCT. 6, 1908.

908,711.

Patented Jan. 5, 1909.

2 SHEETS—SHEET 1.

Witnesses
L. Armstrong
F. C. Jones

Inventor
Joseph Urbanick,

By

Attorneys

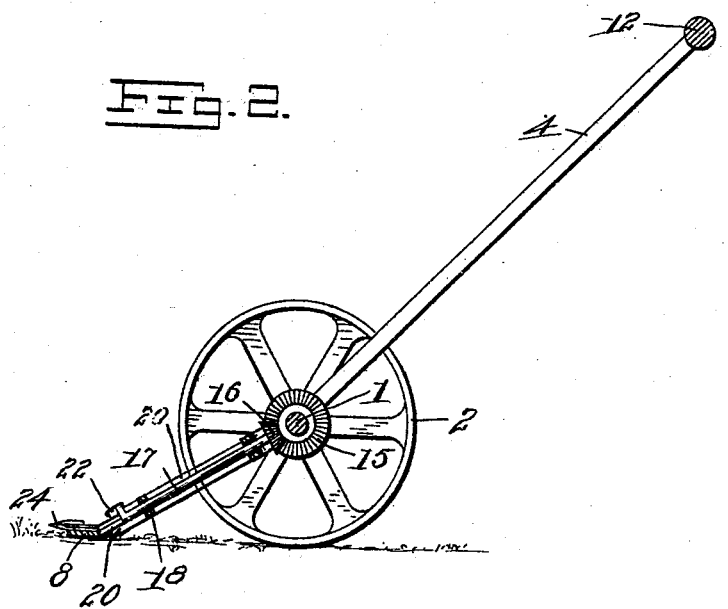

UNITED STATES PATENT OFFICE.

JOSEPH URBANICK, OF ARGYLE, MINNESOTA.

LAWN-MOWER.

No. 908,711.      Specification of Letters Patent.      Patented Jan. 5, 1909.

Application filed September 8, 1905, Serial No. 277,531. Renewed October 6, 1908. Serial No. 456,415.

*To all whom it may concern:*

Be it known that I, JOSEPH URBANICK, a citizen of the United States, residing at Argyle, in the county of Marshall, State of Minnesota, have invented certain new and useful Improvements in Lawn-Mowers; and I do hereby declare the following to be a full, clear, and exact description of the invention, such as will enable others skilled in the art to which it appertains to make and use the same.

This invention relates to lawn mowers.

One object is to provide an exceedingly simple, inexpensive, durable and efficient mower of the character stated.

Another object of the invention resides in the provision of a lawn mower embodying such characteristics that much of the gearing heretofore employed in such machines is obviated and wherein various clutch mechanisms are eliminated.

With the above and other objects in view the present invention consists in the combination and arrangement of parts hereinafter more fully described, shown in the accompanying drawings and particularly set forth in the appended claim, it being understood that changes in the form, proportion, size and minor details may be made within the scope of the claim without departing from the spirit of the invention or sacrificing any of the advantages thereof.

Figure 1:
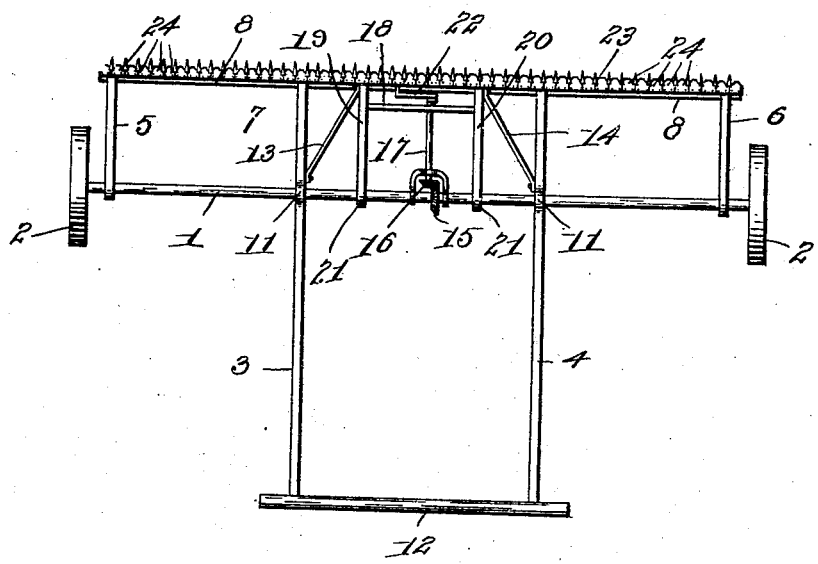
Figure 1:
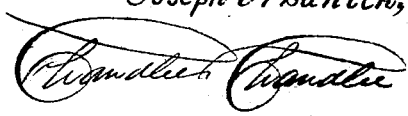

In the drawings: Figure 1 is a top plan view. Fig. 2 is a transverse sectional view.

Referring to the drawings, there is shown a cutter bar 8 from the ends of which extend rearwardly short arms 5 and 6, while a second pair of short arms 19 and 20 extend rearwardly from the cutter bar at points between the ends of the latter. Long arms 3 and 4 extend rearwardly from the cutter bar between the arms 19 and 20 and the arms 5 and 6 respectively, and at the rear end of the arms 3 and 4 is secured a handle 12. In all of the arms are bearings in which is journaled an axle having fixed to its ends the ground wheels 2. The bearings in the arms 19 and 20 are indicated at 21 while the bearings in the arms 3 and 4 are indicated at 11. Braces 13 and 14 extend between the arms 19 and 11 and 20 and 11 respectively.

Connecting the arms 19 and 20 near their forward ends is a transverse brace 18 in which is journaled one end portion of a drive shaft 17, the other end portion of the drive shaft being journaled in a yoke that is pivotally mounted upon the axle 1. At the rear end of the shaft 17 is fixed a beveled pinion 16 that meshes with a beveled pinion 15 on the axle 1. The shaft 17 has at its forward end a crank to which is connected a pitman 22 that is connected in turn with the knife bar 23 having the usual knives 24.

With the construction above described it will be noted that the frame of the machine, formed by the cutter bar and the rearwardly directed arms, has a pivotal movement with respect to the axle so that by manipulating the handle 12 the cutting mechanism may be raised and lowered.

What is claimed is:

A lawn mower comprising a cutter bar having a short rearwardly directed arm at each end, a pair of rearwardly directed short arms intermediate of its ends and a long rearwardly directed arm between each end pair of arms, an axle rotatably mounted in all of the arms, ground wheels fixed to the axle, a knife bar upon the cutter bar, a cross bar connecting the intermediate pair of short arms near their forward ends, a yoke mounted upon the axle, a shaft journaled in the yoke and the cross bar, connections between the shaft and the cutter bar for reciprocating the latter when the shaft is rotated, gears operatively connecting the shaft and axle, and a handle connecting the rear ends of the long arms.

In testimony whereof, I affix my signature, in presence of two witnesses.

JOSEPH URBANICK.

Witnesses:
    R. G. MARLETTE,
    IGNEACY URBANICK.